March 4, 1924.
J. A. SETSER
1,485,726
INSECT DESTROYING MACHINE AND CULTIVATOR
Filed Oct. 24, 1922   4 Sheets-Sheet 1
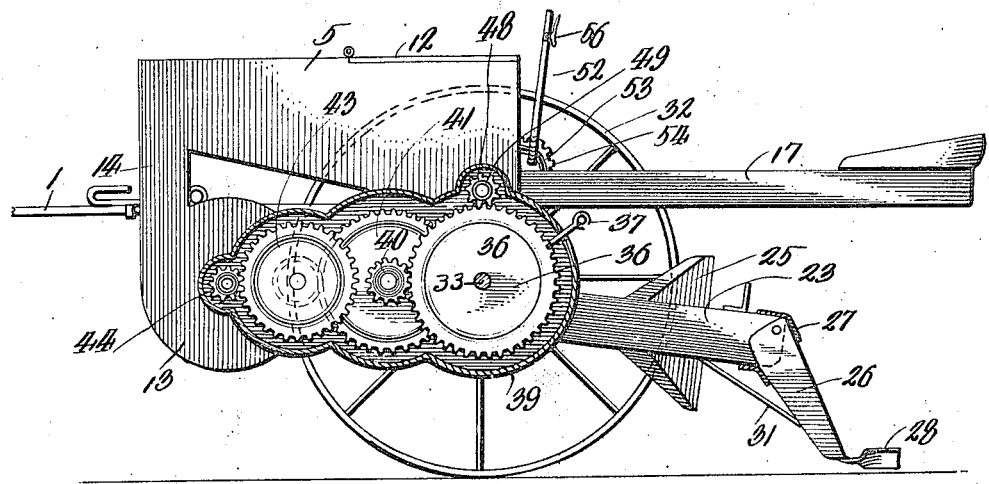
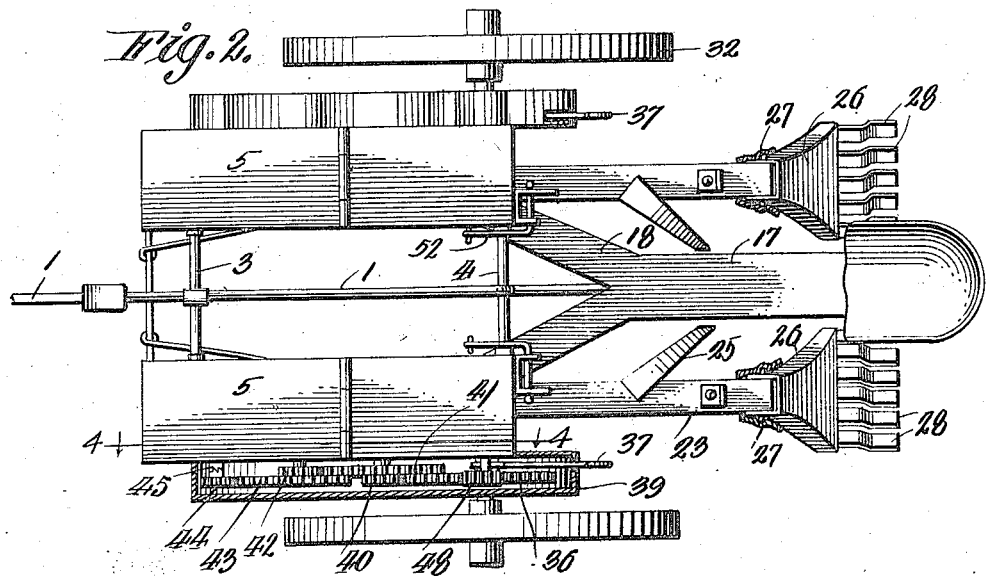
WITNESSES
JAMES A. SETSER, Inventor
By Richard B. Owen, Attorney

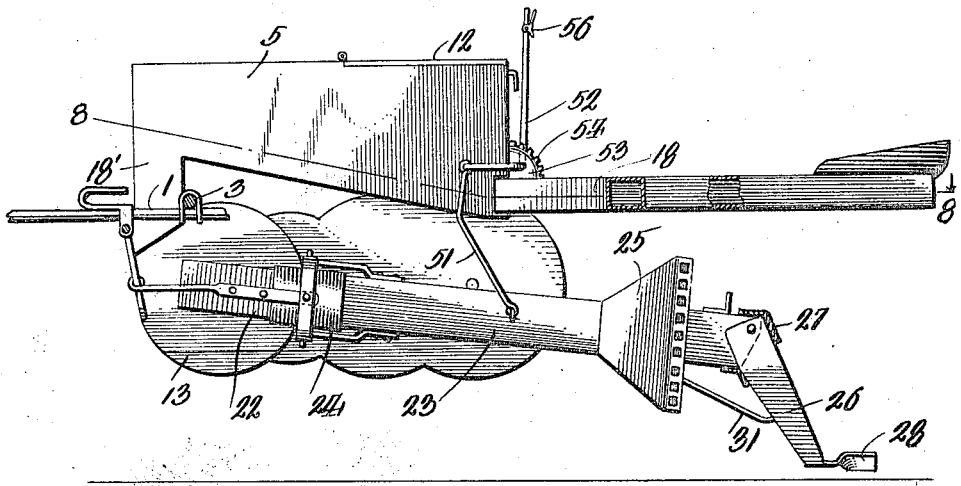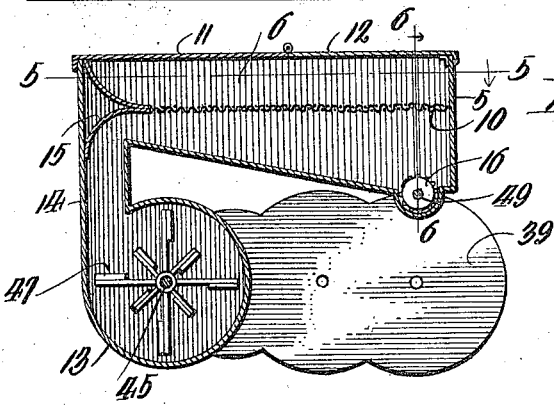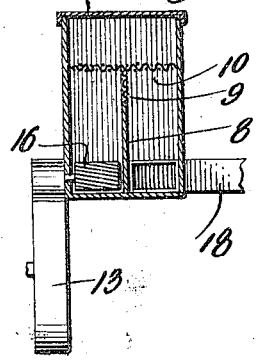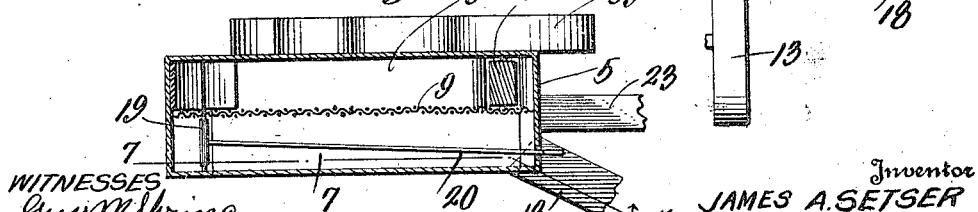

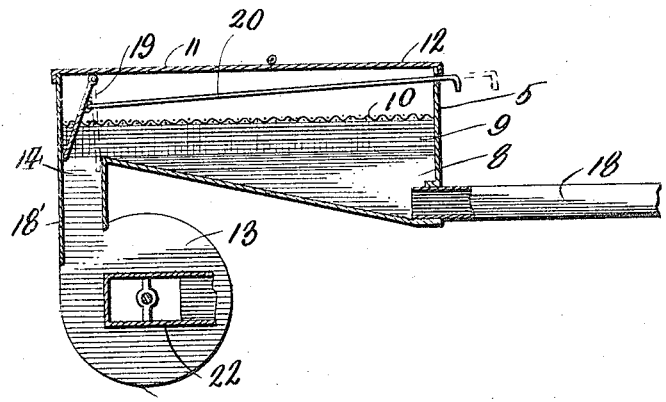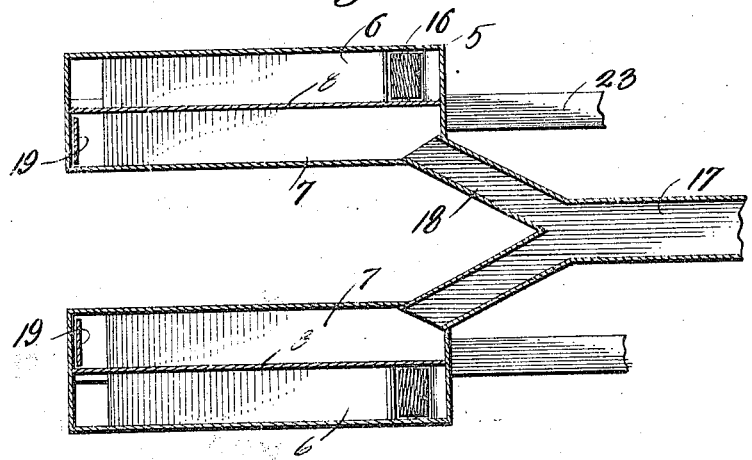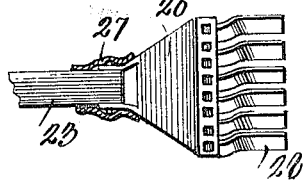

March 4, 1924. 1,485,726
J. A. SETSER
INSECT DESTROYING MACHINE AND CULTIVATOR
Filed Oct. 24, 1922 4 Sheets-Sheet 4
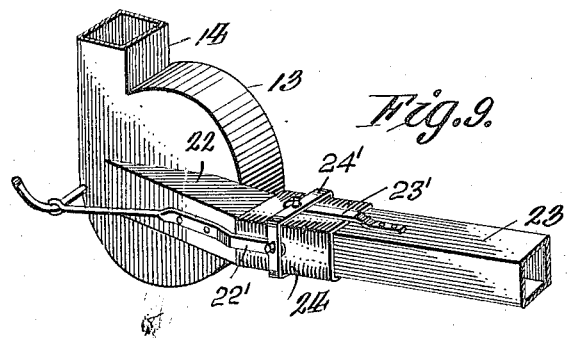
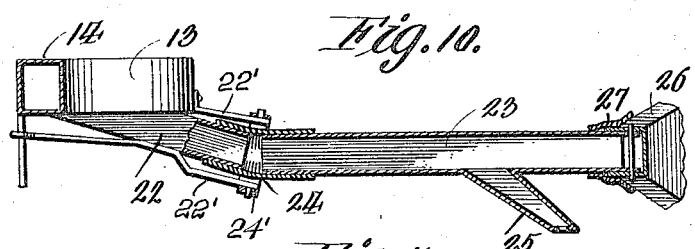
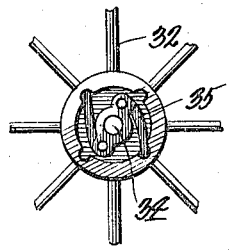
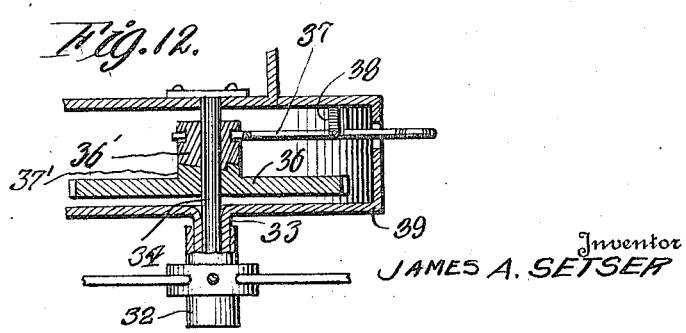
Inventor
JAMES A. SETSER
By Richard B. Owen, Attorney
WITNESSES Patented Mar. 4, 1924.

1,485,726

UNITED STATES PATENT OFFICE.

JAMES A. SETSER, OF ANTLERS, OKLAHOMA.

INSECT-DESTROYING MACHINE AND CULTIVATOR.

Application filed October 24, 1922. Serial No. 596,569.

*To all whom it may concern:*

Be it known that I, JAMES A. SETSER, a citizen of the United States, residing at Antlers, in the county of Pushmataha and State of Oklahoma, have invented certain new and useful Improvements in Insect-Destroying Machines and Cultivators, of which the following is a specification.

The present invention relates to an insect destroying machine and cultivator combined and is particularly adapted for removing boll weevil insects from cotton plants and destroying them.

The object of the invention is to produce a machine designed to be propelled by draft animals or a tractor, equipped with a suction apparatus operated by the movement of the machine to collect the insects and means also operated by the movement of the machine for destroying said insects after they have been collected.

With the above and numerous other objects in view as will appear as the description of the invention progresses, the invention resides in certain novel features of construction, and the combination and arrangement of parts as will be hereinafter more fully described and claimed.

In the drawing:—

Figure 1 is a side elevation of the machine embodying my invention, the gear casing being shown in section, Figure 2 is a top plan thereof, Figure 3 is a central vertical section taken therethrough, Figure 4 is a detailed vertical section taken through one of the hoppers and fan casings, substantially on line 4—4 of Figure 2 looking in the direction of the arrow.

Figure 5 is a detailed horizontal section taken substantially on the line 5—5 of Figure 4 looking in the direction of the arrow, Figure 6 is a detailed vertical section taken substantially on the line 6—6 of Figure 4 looking in the direction of the arrow, Figure 7 is a detailed vertical section taken substantially on the line 7—7 of Figure 5 looking in the direction of the arrow, Figure 8 is a horizontal section taken on the line 8—8 of Figure 3 looking in the direction of the arrow, Figure 9 is a detailed perspective of one fan casing showing the intake tube flexibly connected thereto, Figure 10 is a detailed view partly in section showing one fan housing and intake tube, Figure 11 is a detailed view showing the ratchet arrangement in the hub of one traction wheel, Figure 12 is a detailed section showing the means for shifting the main drive gear, and Figure 13 is a detailed elevation of the bottom side of one of the section heads showing the cultivator knives thereon.

Referring to the drawing in detail it will be seen that the main frame consists of the longitudinally extending bar 1 which forms the tongue extended forwardly of the frame. A forward cross beam or bar 3 is suitably attached to the main bar 1 as is also the rear cross beam 4. Two hoppers 5 are mounted on the frame in spaced relation to each other and so as to extend longitudinally thereof. Each hopper is formed with two compartments 6 and 7 which are separated by a partition 8 the upper portion of which is formed from some foraminous material 9. A horizontally extending partition of foraminous material 10 has its intermediate portion resting on the extension 9 as is shown to advantage in Figure 6. Each hopper is closed as at 11 and a hinged door 12 is provided so that access may be had to the hopper. A fan casing 13 is situated below each hopper and communicates through a tube 14 with the compartment 6 thereof and a baffle plate 15 is disposed adjacent the entrance of the tube 14 so as to direct the movement of the boll weevils and other insects or matter as will be more clearly set forth and understood as the description progresses. In the rear bottom corner of each compartment 6 there is situated an auger 16 or some other suitable grinding implement for the purpose of crushing the boll weevils and cutting them into sufficiently small pieces so that they may pass through the foraminous extension 9 or partition 10 into the compartment 7. The Y-shaped horizontally extending outlet tubing 17 has its diverging legs 18 communicating with the rear ends of the compartments 7 and its outlet end terminates at the rearmost part of the machine. At the forward end of each compartment 7 there is situated a depending tube 18' and a hinged valve 19 is mounted adjacent thereto and controlled by the rod 20 so that communication with this tube 18 may be closed when desired.

As is shown to advantage in Figures 9 and 10 an intake tube 22 extends from the side of each fan casing and communicates with an extension 23 through a flexible tube connection 24. Suitable bracing means 24' is disposed about the flexible pipe 24 and is attached to pipe 22 by arm 22' and pipe 23 by arm 23'. A suction head 25 is provided intermediate the ends of each intake extension 23 and these heads 25 point toward each other and are adapted to shuck insects from the plants when the machine is in motion. A head 26 is hingedly mounted on the end of each extension 23 and a flexible cover 27 is provided for this joint. As is shown particularly in Figure 13 these suction heads 26 have mounted thereon a plurality of rearwardly extending cultivating knives 28 which are adapted to dig slightly into the ground thereby cultivating the same and loosening up any insects contained in the surface of the ground adjacent the roots of the cotton plants. The heads 26 are braced so as to extend in rigid relation to the extensions 23 by rods 31 and as is indicated in Figures 1 and 3 these heads extend angularly therefrom.

The apparatus which has thus far been described is all supported on a pair of traction wheels 32 each of which is rotatable on a hollow stub axle 33 having a rotatable shaft 34 therein which is rotated by the pawl and ratchet arrangement 35 in the hub of the wheel when said wheel is rotating so that the machine moves forwardly. A sliding clutch element 36' is keyed to the shaft 34 and is movable longitudinally thereof by the rod 37 fulcrumed intermediate its ends on the bracket 38 carried within the gear housing 39 which encloses all the gears about to be described. The gear 36 includes a clutch segment 37' engageable with the clutch element 36' by means of meshable teeth. A clutch element is formed on the gear 36 and is adapted to be engaged by the sliding clutch element 36'. The main gear 36 is in engagement with the spur gear 40 which is keyed to a shaft journalled in the gear housing and to which also is keyed a gear 41 which meshes with the spur gear 42 mounted on a shaft upon which is also mounted the gear 43. This gear 43 is in mesh with a spur gear 44 that is carried and keyed to the shaft 45 which extends into the fan housing and to which is keyed the fan 47 therein.

A spur gear 48 is in mesh with the main gear 36 and is keyed to a shaft 49 upon which is mounted the crushing auger 16. From the description as it has thus far progressed it will be readily understood that upon movement of the vehicle or machine in a forward direction the fan and the grinding auger will be rotated by the movement of the machine through the series of gears thus described. The rotation of this fan will cause a suction through the tubes 22, 23, and the suction heads 25 and 26 thereby collecting boll weevils, and other insects and some foreign matter into the fan casing from whence they will be blown into the compartments 6 of the hoppers 5. The air will be allowed to proceed straight through the foraminous partitions 9 and 10 but the boll weevils and other foreign matter will not be passed through this foraminous material until they have come into engagement with the grinding auger so as to be crushed and cut up sufficiently to pass through the apertures in the foraminous partitions. From the compartment 6 the matter will pass into the compartment 7 through the branches 18 and through the main trunk of the outlet tubing 17.

As was previously explained the extensions 23 are flexibly connected to the tubes 22 and these extensions are supported by links 51 which are carried by the lower ends of the bell crank levers 52 which are suitably fulcrumed in the brackets 53 which are provided with toothed sectors 54 with which suitable catch mechanisms 56 are engageable on the bell crank levers 52 so that the extension 23 with their suction heads may be held in suitable adjusted positions.

Although I have described my machine with some degree of particularity, it is to be understood that numerous changes may be made in form, proportion, arrangement, and combination of parts without departing from the spirit of the invention as hereinafter claimed.

Having thus described my invention what I claim as new is:—

1. In combination, a portable frame, a suction apparatus mounted on the frame, a suction tube leading from said apparatus, a suction head mounted on the end of said tube and provided with a plurality of cutting knives in the manner and for the purpose specified.

2. In combination, a portable frame, a suction apparatus thereon, a pair of spaced longitudinally extending tubes communicating with the suction apparatus, a suction head on each tube extending toward the opposite tube, a second head on each tube at the end thereof, and cultivating knives on said second head.

In testimony whereof I affix my signature in presence of two witnesses.

JAMES A. SETSER.

Witnesses:
T. H. MILLS,
S. P. HOUTCHENS.